Figure 1:
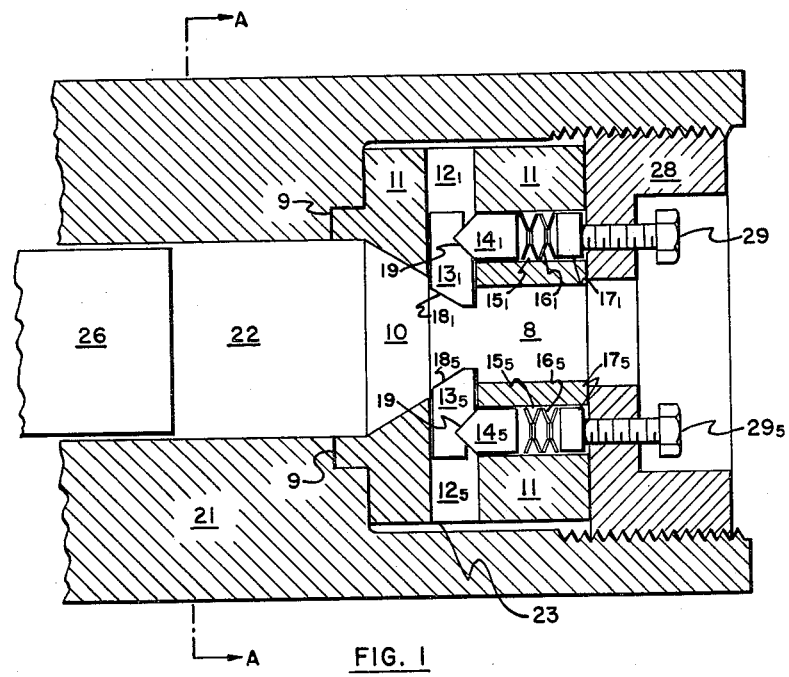

Dec. 18, 1962     H. A. THOMAS     3,068,515
EXTRUSION APPARATUS

Filed Aug. 31, 1960     2 Sheets-Sheet 1

Dec. 18, 1962     H. A. THOMAS     3,068,515
EXTRUSION APPARATUS

Filed Aug. 31, 1960     2 Sheets-Sheet 2

United States Patent Office 3,068,515
Patented Dec. 18, 1962

3,068,515
EXTRUSION APPARATUS
Henry A. Thomas, Baton Rouge, La., assignor to Ethyl Corporation, New York, N.Y., a corporation of Delaware
Filed Aug. 31, 1960, Ser. No. 53,245
1 Claim. (Cl. 18—12)

This invention relates to apparatus for the processing of sludges of finely subdivided metals. More particularly, the invention relates to improved apparatus for the pressure extrusion of sludgs having high components or proportions of finely subdivided metals in conjunction with at least one additional liquid phase. Even more specifically, the invention is related to apparatus having particular utility in processing high solid-sludges wherein the physical characteristics of the sludge, i.e., properties which effect the resistance to forcing the sludge through a restricted extrusion orifice is variable with time or with variations in the preceding process which results in formation of said free sludges.

It is frequently necessary to process high solid sludges, and especially sludges of metal components accompanied by one or more liquid phases. A typical illustration of this type of problem is the processing of finely subdivided lead sludges resulting from the manufacture or manufacturing reaction employed in making organometallic lead compounds. In such instances, the commercial technique involves the reaction of an alkali metal-lead alloy with an alkylation agent such as ethyl chloride, and in such reactions only a portion of lead is consumed. Hence, the resultant reaction product mixture includes a liquid alkyl lead compound, finely subdivided lead metal solids, minor quantities of the liquid alkylating agent, and by-product compounds such as, for example, sodium chloride and sodium sulfate. Such product mixtures are initially separated by a steam distillation, which volatilizes a substantial portion of the organometallic liquid product desired, and forms a distillation residue including minor quantities of the alkyl lead organometallic compound desired, the subdivided lead, and an aqueous phase usually containing, dissolved therein, by-products formed in the synthesis reaction. It has been discovered that such sludge is very expeditiously further processed by subjecting to relatively elevated pressure in an extrusion zone, having an extrusion orifice as one terminal boundary thereof, whereby the lead solids are forced through the extrusion orifice under sufficient pressure to form a substantially cohesive or homogeneous lead shape, and concurrently the liquid phases present are segregated from said so-formed lead shape. Accordingly, the above described general extrusion is a highly effective method in conjunction with a primary separation involving contacting with an aqueous phase, as in the above mentioned steam distillation. Similar systems occur in other industrial operations, either as a result of a preceding chemical synthesis operation, or deliberately in preparing a sludge mix from which it is desired to form a solid shape.

While the general procedure of extrusion and concurrent further separation of liquid phases, above described, has been found highly effective, it has also been discovered that the physical properties of the sludges, with respect to their processability in this fashion, are highly variable. Thus, although a particular apparatus configuration is quite suitable for a specific sludge feed, yet the prior processing history is sufficiently erratic or variable that the properties of the sludge thus produced, and providing the feed for the extrusion operation, are also highly variable. Thus, whereas in one instance an apparatus provided with an extrusion ratio of, say, 4:1, is highly effective, nevertheless at a slightly later period, it may be found that effective operation at such a ratio is not possible. By extrusion ratio is meant the transverse area ratio of the extrusion orifice to the cross sectional area of the chamber in which the sludge is processed toward the extrusion orifice. By processability is meant the ability to force the lead solids through the extrusion orifice and consistently achieve a substantially homogeneous or cohesive solid shape, which is a highly desired result of the operation. Accordingly, need has developed for an apparatus and method which exhibits particular latitude with respect to allowing effective operation with sludges of readily deformable metals and at least one accompanying liquid phase, wherein said sludges vary considerably in their resistance or ease of processing by the general extrusion-recovery operation described.

The principal object of the present invention is to provide a new and improved apparatus whereby high solid sludges of variable physical attributes, with respect to extrusion recovery, can be readily processed. More particularly, an object of the present invention is to provide apparatus, and specifically an extrusion die or orifice, susceptible of providing a constant type resistance to flow of malleable or workable metals, in conjunction with minor quantities of liquid phases, such that uniform processing treatment is maintained. Alternatively, an object of the present invention is to provide an extrusion apparatus suitable for application, in extrusion machines generally, wherein a variable total resistance to extrusion force is provided by automatic alteration of the extrusion ratio, responsive to the characteristics of the sludge, such that a substantially uniform product is achieved along with a highly efficient degree of recovery. Other objects will appear hereinafter.

The apparatus of the present invention comprises an extrusion orifice apparatus, for combination or adaptation with an extrusion machine, said orifice device being force responsive to adjust its effective transverse or opening area in such fashion that a relatively constant pressure, or approximately constant pressure, is achieved, said pressure being adjustable if desired to assure the desired characteristics of the materials forced through the extrusion orifice.

Figure 2:
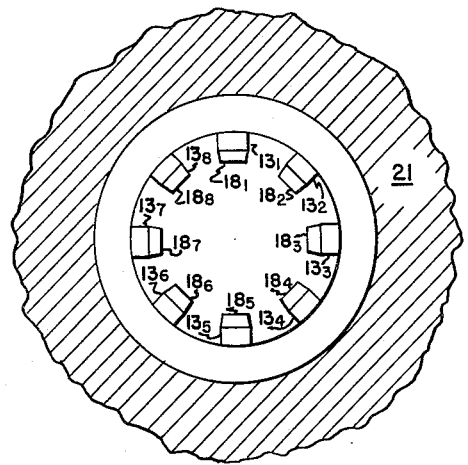
Figure 3:
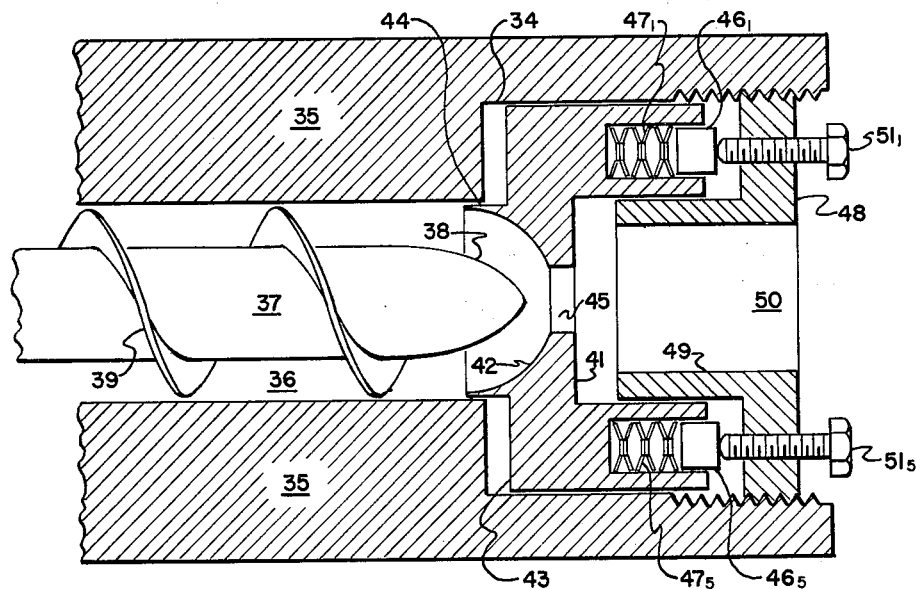
Figure 4:
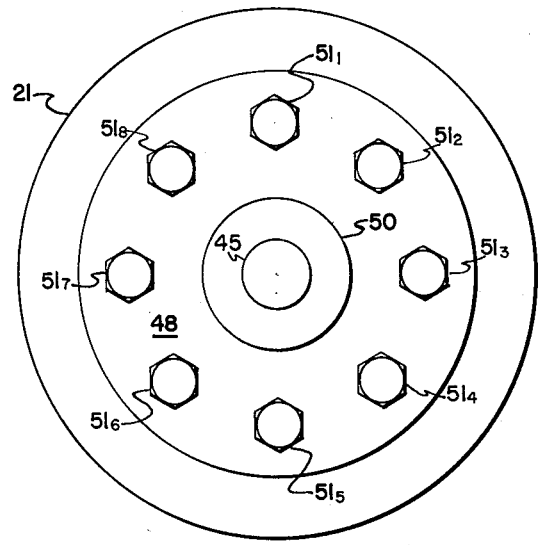

The principle of the apparatus of the present invention, and the details of the various embodiments thereof, will be understood from the detailed description below of typical and preferred embodiments and from the figures illustrating the same, wherein:

FIG. 1 is a transverse cross sectional view of one embodiment of the variable aperture orifice assembly positioned at the terminus or discharge end of an extrusion apparatus, FIG. 2 is a transverse cross sectional view of the apparatus illustrated by FIG. 1 at section AA, FIG. 3 is a transverse cross sectional view of another embodiment of the invention characterized by a movable ring member which, in conjunction with a laterally immovable conic section defines an extrusion orifice of variable size, and FIG. 4 is a transverse end view of the embodiment illustrated by FIG. 3.

Referring to FIG. 1, the assembly of the present embodiment is shown mounted in the terminal or discharge end of an extrusion machine barrel 21, having an extrusion bore 22 therein, wherein a reciprocating ram 26 is slidably positioned for pressing a charge toward the discharge end.

The principal components shown of the apparatus of the invention include a ring member 11, extrusion pins $13_1$, $13_5$ and restraining pins $14_1$, $14_5$. The ring member 11 is a circular member adapted to loosely fit into a recess 23 bored in the extrusion machine barrel 21. Precise positioning of the ring member 11 with respect to the bore 22 of the extrusion barrel 21 is assured by a machined shoulder member 9 adapted to engage a corresponding precisely machined section of the extrusion barrel wall 21. The ring member 11 includes an entry portion 10 which is a converging frusto-conic section diminishing in diameter away from the extrusion barrel 22. The ring member 11 includes a bored portion 8 of smallest diameter, as the terminal opening through which the material extruded will pass. The ring member also has therein a plurality of radially oriented channels $12_1$, $12_5$, and a corresponding number of laterally oriented channels $15_1$, $15_5$, which intercept the first mentioned radial channels $12_1$, $12_5$. Slidably positioned in the radial channels are orifice pins $13_1$, $13_5$, these being provided at the innermost ends thereof with inclined faces $18_1$, $18_5$ which, desirably, correspond in convergence to the walls of the conic section 10 of the ring member 11. In addition, the orifice pins $13_1$, $13_5$, have inclined engaging faces $19_1$, $19_5$ which correspond in alignment to engaging faces on the abutting ends of the restraining pins $14_1$ $14_5$. The restraining pins, as clear from FIG. 1, are slidably positioned in the laterally disposed channels $15_1$, $15_5$ of the ring member 11. Also positioned in said cannels $15_1$, $15_5$, are assemblies of high compression resilient members, typically Belleville washers, which are dished washers capable of exerting a high resilient force. The assemblies of washers $16_1$, $16_5$, the exact number thereof being variable according to the needs of the operation for which the assembly is intended, is pressed by a follower block $17_1$, $17_5$, which is positioned by an adjustment screw $29_1$, $29_5$. The ring member 11 is rigidly and immovably positioned in place by the action of a retainer ring 28 which is threaded into a corresponding threaded portion of the recess 23 in the extruder barrel. Mounted in threaded holes in this retainer ring are the aforementioned retainer or adjustment screw $29_1$, $29_5$.

It will be apparent that the orifice pins $13_1$, $13_5$ projecting into the bored portion of the ring member 11, and having inclined operative faces $18_1$, $18_5$, when exposed to a force caused by compression of material being extruded under the action of the ram member 26 toward the orifice assembly, will be acted on by a force vector tending to cause radial displacement. The engagement of the orifice pins $13_1$, $13_5$ by the faces of the restraining pins $14_1$, $14_5$, under the lateral pressure exerted by the assemblies of resilient washers $16_1$, $16_5$ thus prevents outward movement of the orifice pins $13_1$, $13_5$, until a certain pressure is achieved thereon. When such force is applied, the orifice pins $13_1$, $13_5$ will move outwardly, allowing retraction of the restraining pins $14_1$, $14_5$ in the respective channels, against the resilient means above mentioned. This action will thus result in the enlargement of the actual orifice apertures. This is more readily understood by reference to FIG. 2, being a transverse cross sectional view AA of the apparatus, showing the protrusion of the orifice pins $13_1$ ... $13_8$ in the bore 8 of the ring member 11. When the motivating force, induced by the movement of the material being extruded is decreased, then the reciprocal action occurs, viz., the restraining pins $14_1$, $14_5$ are urged in the reverse direction by the resilient washer assemblies $16_1$, $16_5$, causing inward movement of the orifice pins $13_1$, $13_5$. It will be noted that in this embodiment, a secondary beveled face at the outer portion of the orifice pins $13_1$, $13_5$ acts as a stop to terminate inward movement of said orifice pins by the action of the restraining pins $14_1$, $14_5$, thus determining the maximum inner position, or spacing of the orifice pin.

A particular advantage of the present embodiment is the fact that the actual orifice aperture defined by the orifice pins $13_1$ ... $13_8$, in conjunction with the wall of the ring member bore 8, provides a toothed configuration. Hence, the flow of material being extruded through this aperture causes a keying effect and actually increases the peripheral surface with respect to the transverse area of the extruded material, which contributes to the homogeneity of the material extruded and the separation of any liquid phase in the extrusion material charged.

It will be apparent that the proportions of the apparatus of the above described embodiment, illustrated in FIGS. 1 and 2, is susceptible of considerable variation with respect to proportions, and with respect to the degree of resistance of the orifice pin elements to radial displacement. Thus, by tightening or loosening the retainer screws $29_1$, $29_5$, the pressure applied to the restraining pins $14_1$, $14_5$ can be significantly varied. In a typical embodiment, employing eight orifice defining pins peripherally spaced around a ring member such as 11, an individual force of 4,000 pounds is applied on each restraining pin by the appropriate torque application on the corresponding retaining screw. The force applied in such manner will vary according to the physical properties of the material being extruded, and according to the angle of the face of the orifice pin, and the angle of the engaging faces of the orifice pin to the restraining pin. It will be apparent that, dependent upon the selection of such angles the actual centripetal force applied to each orifice pin by the resilient means such as the Belleville washers and the restraining pin, will vary according to the selection of such angles and the degree of friction in the sliding parts. The provision of adjustable retainer screws permits ready adjustment for a particular situation, and, according to the principle of operation of the apparatus, variations in physical characteristics of the material being extruded will result in corresponding increase or decrease of the orifice aperture defined by the orifice pins and the bore of the ring member 11. It will be clear that upon radial outward movement of the orifice pins that the effective orifice size is increased, and the so-called extrusion ratio is decreased, the extrusion ratio being the ratio of the transverse areas of the bore of the extrusion chamber to the limiting aperture for extrusion. Thus, when an extrusion feed material decreases in liquid phase composition, the restrictive tendency of an orifice of a given size then increases, and the present apparatus will thus permit dilation or enlargement of such orifice aperture, with the result that the effective unit pressure at the point of extrusion is maintained substantially constant, and the physical characteristics of the extruded product are maintained more uniform.

In certain embodiments of the invention, the automatically adjusting orifice aperture is established by means of two laterally spaced elements, one of which is laterally fixed, whereas the other is slidably positioned to allow alteration of lateral disposition, relative to the other, with a configuration, in cross section, admitting and providing of a variation in the effective extrusion aperture opening accompanying such lateral displacement. Such an embodiment is illustrated in FIG. 3, wherein a slidable ring member is resiliently positioned and can be resiliently moved in response to the variations of total force applied thereto as a result of the extrusion operation.

Referring to FIG. 3, the principal components of the apparatus of the present invention include a ring member 41, which is slidably mounted on a recess 34 in a barrel 35 of an extrusion apparatus. Desirably the ring member 41 includes an extending lip or guide portion 44, which makes a snug sliding fit with the interior of the bore 36 of the extrusion barrel 35, thus providing a snug connection between said ring member 41 and the said extrusion barrel bore 36. In this embodiment, a helical screw 37 within the extrusion barrel bore 36, said screw having a nose or converging portion 38 which contracts in a direction away from the interior of the extruder barrel, or towards the discharge of the extruder barrel, and is positioned fixedly, with respect to lateral position, adjacent the ring member and spaced apart therefrom, so that a space is defined between the ring member and the said nose portion 38. The ring member 41 is fixed in position in a yieldable manner by the thrust of a resilient assembly, or series of assemblies $47_1$, $47_5$, each comprising a plurality of spring-like members such as Belleville washers, or equivalent resilient members, bearing on the periphery of the ring member in a direction toward the interior of the extruder barrel. Backup or push members or blocks $46_1$, $46_5$ provide the thrust against the resilient spring-like members $47_1$, $47_5$, the positioning of said follower blocks $46_1$, $46_5$ being accomplished by retainer screws $51_1$, $51_5$, which engage corresponding threaded openings in a retainer ring 48. The retainer ring 48 is threaded in place by threaded engagement with the wall of the extruder barrel or adjacent the terminal end thereof. A projecting guide sleeve portion 49 of said retainer ring, extending toward the orifice ring member 41 facilitates alignment and retention of the spring member assemblies $47_1$, $47_5$. The said sleeve-like member may be actually coextensive in diameter with the recess 34 of the extruder barrel, having peripherally spaced chambers for the spring-like assemblies $47_1$, $47_5$.

In operation, rotation of the helical screw causes, by the action of the flights 39 thereon, movement of the material being extruded toward and through the space defined by the nose portion 38 of the screw and the entrant portion of the ring member 41. As noted, the entrant portion 42 of the orifice ring member 41 is a converging section, which may have straight or curved walls in cross section, converging toward the discharge of the apparatus. Hence, the space defined between the nose portion 48 of the helical screw and the entrant portion of the die or ring member 41 is an annular space of diminishing cross section with lateral disposition away from the interior of the extruder barrel. It will be apparent that shifting of the ring member 41 toward the helical screw will be accompanied by a diminution of the transverse area of said annular space, and conversely, a shifting of the ring member 41 away from the helical screw will result in an enlargement of said space.

In operation, then, with the appropriate force being applied by the resilient assemblies $47_1$, $47_5$, according to the proper torque being applied to the retainer screws $51_1$, $51_5$, an automatically varying resistance force to extrusion will be applied. When the characteristics of the material being extruded changes such that a greater force is required to extrude at a constant extrusion ratio, the total force applied to the die ring member 41 by the movement of the material being extruded, will increase, and there will be a shifting of the ring member away from the nose portion 38 of the screw, where consequent enlargement of the extrusion space as previously defined, hence the unit pressure or the mechanical working force being applied to the material being extruded, at and in the above mentioned extrusion zone, will be maintained virtually constant, and the properties of the extruded material will be preserved in a consistent manner.

The embodiment of FIG. 3 as above described is further illustrated in FIG. 4, being an end view of the assembly of the embodiment of FIG. 3. In this embodiment, eight retaining screws are employed. It will be apparent that the spacing size and number of the retaining screws $51_1$, $51_5$ will vary according to the size of the apparatus, the characteristics of the materials being processed, and the absolute total forces which are necessarily applied to the material at the point of extrusion.

It will be apparent to one skilled in the art that many variations in proportions and details of design are permissible within the scope of the invention illustrated by the preceding two embodiments. In all cases provision is necessarily made, for automatic adjustment, by means of shifting of a die aperture forming member in response to increases or decreases of total force applied, with corresponding increase or decrease of the effective orifice aperture. As clear from the preceding description, the particular "normal" reference force level at which enlargement begins to occur will be dependent upon the pressure applied to the resilient members restraining movement of the aperture forming element, said tension or pressure being applied by the adjustment screws employed, thus allowing establishment of different base planes for different processing situations.

The precise details of design of the elements forming the periphery or the orifice aperture can also be appreciably varied. For example, in the embodiment illustrated in FIGS. 1 and 2, the orifice pins are conveniently of circular or cylindrical cross section, but this is not an essential feature. Cylindrical cross section pins facilitate manufacture of the assembly, in that the pin channels of the ring member thereof can thus be merely drilled or bored channels. However, in certain situations, it may be desirable to provide orifice establishing pins of rectangular or square cross section. The total degree of movement of said orifice pins, and consequently of the restraining pins such as used in the first described above embodiment, will depend upon the necessary variation in extrusion ratio, and hence of extrusion absolute aperture transverse area, as is discussed below.

Similar considerations will be present for individual designs of apparatus embodiments as illustrated by FIGS. 3 and 4. In certain cases, the ring member, with an orifice defining aperture therein will have a conical entrance angle of a total of about 90° inclusive, but in other situations entrant angles of from 70 to 160° or thereabouts will be effective. It will be apparent that the configuration of the nose portion of a helical screw, which in such embodiments, forms part of the actual extrusion orifice, is also subject to similar variations. Since, a characteristic of this class of embodiments is the provision of an annulus of decreasing transverse cross sectional area, it will be evident that the transverse cross section of said nose portion should decrease at a lower degree, laterally, than the transverse area of the ring member, the bore thereof which defines the outer extremity of the orifice opening. As in the other embodiments the degree of variation of absolute orifice size and hence of the effective extrusion ratio, will be dependent upon the variation in characteristics of material being processed and other factors. In a typical embodiment, a total permissible variation of extrusion ratio of from 1.5:1 to about 2:1, or corresponding degrees of variation, will be entirely adequate to provide for most normal changes. This corresponds to a variation in the effective or actual orifice opening of about 33 percent. As in other embodiments, the provision of resilient spring members tending to restrain outward movement of the ring member, to which appropriate compression force is applied by retainer screw members, allows the establishment of different reference force levels which must be exceeded before outward displacement of the ring member under the influence of extrusion forces, is accomplished. In a typical installation employing an extruder having a barrel diameter of 5 inches, and a maximum extrusion ratio (minimum actual extrusion orifice area) of 2, will be susceptible of enlarging to provide an extrusion ratio of up to 1.5, upon establishment or creation of pressures greater than 20,000 pounds per square inch at the initial extrusion orifice opening.

It must be appreciated that the creation of a greater force, tending to enlarge the effective orifice area, with such enlargement being accomplished, amounts to preserving the actual pressures or mechanical working forces being applied to the material processed at the extrusion zone, hence the continuity of characteristics of the resultant product is preserved.

The materials of construction to be employed will vary according to the chemical characteristics and physical attributes of the material processed. Generally, mild steel can be readily employed for some of the portions of the apparatus, but for the die configuration defining members, high strength and extra hard alloy steels are highly desirable.

Having fully described the invention and several embodiments thereof, what is claimed is:

A force responsive variable opening orifice apparatus for an extrusion apparatus comprising a circular ring member die element having first and radial pin channels therein, radially movable orifice pin elements positioned and slidably movable in said first channels but always projecting into the circular opening of the said ring member die element, laterally oriented second channels in said ring member intercepting said first channels, restraining pin members in the said second channels adapted to engage the orifice pin members and to be laterally disposed upon radial movement of the orifice pins, resilient spring means and spring follower means positioning and compressing the spring means, said spring means engaging said restraining pin members, whereby outward movement of said orifice pin elements compress said spring members by lateral movement of the restraining pins and said orifice aperture is thus enlarged in response to a greater extrusion total force, and whereby inward movement of said orifice pins results from the reverse lateral movement of the restraining pins and said orifice aperture is decreased in response to a lower total extrusion force, the orifice aperture being defined in part by the internal configuration of the ring die element and in part by the orifice pin elements.

References Cited in the file of this patent

UNITED STATES PATENTS

| | | |
|---|---|---|
| 2,289,787 | Kaschke et al. | July 14, 1942 |
| 2,365,482 | Manken et al. | Dec. 19, 1944 |
| 2,651,952 | Leavenworth | Sept. 15, 1953 |